3,184,371
FOAMED SILICATE STRUCTURES
Alois Seidl, Thurnstein, Germany, assignor to Wasag-Chemie Aktiengesellschaft, Essen, Germany
No Drawing. Filed Nov. 14, 1960, Ser. No. 68,637
Claims priority, application Germany, Mar. 3, 1960, W 27,376
9 Claims. (Cl. 161—193)

This invention relates to a method for making foamed silicate structures from fibrous inorganic silicates and alkali silicates. These foamed structures are fire-resistant, water-resistant and possess excellent thermal and acoustical properties as well as being very amenable to mechanical forming operations.

Ever since 1883 when the first United States patent was issued relating to expanded silicates as thermal insulators for a fireproof safe, there has been a continual but sporadic interest in the utilization of expanded silicates for a variety of purposes. For example, it has been suggested in the prior art to fabricate thermal insulation by concentrating alkali silicates and then heating them in such a manner that an intumescence of the silicate is obtained due to rapid evaporation of the water. This process, though leading to intumescent material, does not result in a mass which is sufficiently firm or rigid for general usage. To overcome this disadvantage, it has been further suggested in the prior art to add such porous filters as quartz, magnesia, mica and asbestos to improve the mechanical properties of the mass. Furthermore, it has been suggested to add gas evolving substances, such as potassium chlorate, to increase the number and size of the pores in the foamed mass. In all of these methods, however, there is necessitated a complicated preparation of the solutions which can be used as raw materials.

It is also known that it is possible to obtain relatively firm intumescent masses by treating mixtures which are not completely dissolved. In this way not only is the final product made mechanically superior, but the technology of the method steps is simplified. However, if this expedient is taken, there are other serious disadvantages in that the resistance to water and humidity and the high temperature mechanical properties are decreased to such a value that the final product still remains unsatisfactory for a wide variety of uses.

Still another suggestion found in the prior art incorporates aged gels of sphere-shaped silicates for binding fibrous silicates into a coherent mass. This method, though requiring a complicated pretreatment of all the materials used, does not lead to a technically superior product. That is to say, the product of this process does not possess in combination, low weight, good mechanical properties, excellent thermal and acoustical properties and resistance to humidity.

The object of the present invention, therefore, is to obviate the shortcomings and disadvantages of the prior art product by providing new molded foamed structures having excellent thermal, acoustical, mechanical and weathering properties.

Another object is to provide a relatively simple method for the manufacture of these novel foamed structures.

Still another object is to provides a novel foamed structure having porosities of different diameters.

A further object is to provide molded foamed structures having reinforcing members inserted therein.

A still further object is to provide laminates of these molded structures with other materials, such as glass, or plastics or metals.

Upon further study of the specification and appended claims, other objects and advantages of the present invention will become apparent.

To achieve the objects of the present invention, it is necessary to produce the molded foamed shapes in the following manner:

Firstly, a mixture is formulated containing, in parts by weight, one part alkali metal silicate, 0.02 to 0.7 part of an inorganic fibrous silicate, and 2 to 10 of water. Secondly, this mixture is heated to about 140–360° C. to drive off any free water phase, thereby resulting in a substantially dried mass having a maximum of about 10% chemically combined water in the matrix. Thirdly, it is necessary to crush the dried mass to obtain particles of 0.1–10 mm. Fourthly, the crushed particles are placed in a mold and heated to 700–900° C. for a sufficient time to obtain a foamed structure having the desired porosities and cell wall thicknesses. Lastly, the foamed structure is cooled to below its softening temperature, thereby obtaining a rigid structure having excellent thermal, acoustical, mechanical and weathering properties.

With respect to the first step, it is to be understood that the fibrous inorganic silicate encompasses those silicates which are found either naturally in the fibrous state, or can be converted to the fibrous state by mechanical procedures. Examples of inorganic fibrous silicates include glass wool, basalt wool, rock wool, and asbestos wool.

Further in connection with the first step, it is to be noted that the alkali metal silicate includes sodium, potassium, and lithium silicates, but it is preferred to use the sodium silicate. Whereas, it is necessary to maintain a ratio of the alkali metal silicate to fibrous silicate to water of about 1 to 0.02 to 10 in parts by weight, it is preferable to maintain the ratio at about 1 to 0.15 to 5, and for even better results from 1 to 0.3 to 4.

In addition to the alkali metal silicate, fibrous silicate and water, it is also advantageous to add minor quantities of alkaline earth carbonates and the like in order to reduce the surface tension of the mass when it is heated in the final step to above 700° C. By virtue of this surface tension reducing agent, pores with thinner walls can be formed, thereby resulting in foamed structures having lower densities in the range of about 0.25 g. per cubic centimeter. The preferred species and quantity of this surface tension reducing agent is 0.1–3% calcium carbonate by weight of the first mixture. It is also advantageous for some final uses to add pulverized stone-like silicates to this initial mixture. These stones, like pumice stone, having a particle size of 1–3 mm. are not completely dissolved in the alkali silicate solution and consequently, the cooling time in the final step is thereby shortened. In the event that these stones are used, it is desirable to use a sufficient quantity of them so that the final structure contains them in distances not exceeding about 10 mm., but at the same time, not more than about 5% by weight of the total mixture should be used.

If the final product is to be used for decorative purposes, it is also possible to add to this initial mixture, about 0.1–1% by weight of the mixture one or more color-yielding salts, such as cobalt sulfate, potassium chromate, cadmium sulfide, copper and iron salts. By mixing several different salts with the initial silicate mixture, there is produced in the ultimate product an attractive variegated color pattern.

With respect to the second step, it can be conducted by any conventional method, such as hot air convection or infra-red radiation or high frequency induction, etc. Whereas, in general, it is necessary to heat the mixture to 140–360° C., it is preferred to heat it between 200 to 360° C., and for the best results to about 300° C.

With respect to the crushing step, any particle reduction system or apparatus can be used as long as the final particles are comprised of particle sizes between 0.1–10 mm. This particle reduction step is not only necessary to facilitate the filling of the mold with product, but it is also important with respect to the pore size of the final product. Furthermore, it is preferred to provide a final product having varied pore sizes; consequently, a varied particle size within the aforesaid range is also preferred. For example, excellent foamed structures are obtained from an aggregate having 50% by weight 0.1–1 mm., 40% 1–5 mm. and 10% 5–10 mm.

With respect to the molding step, above 700° C., the mass becomes viscous, and pores which are initially formed have a wall thickness of about 0.1–1 microns. These pores are interconnected by small channels, but upon further heating, larger pores are formed and these channels disappear. The diameter of these larger pores depends upon the temperature and duration of heating. At temperatures between 700° C. and 900° C., the pores first expand, but if heated for an excessive time at these temperatures, the pores contract with an increase in the thickness of the pore walls. In general, the moldable mass is kept at 700–900° C. for 1 to 30 minutes, assuming that the mass is uniformly heated. The preferred time temperature conditions are 770° C. to 820° C. for 8 to 20 minutes.

In many cases, however, it will not be possible to heat the mass uniformly as the thickness of the material will be such as to provide a substantial resistance to heat transfer. Accordingly, it may be necessary to compromise the properties of the exterior side of the piece with the properties of the interior side of the piece. As a matter of fact, for some uses, it is preferred to have a non-uniformly heated piece, as this results in pores which have a wide variation in size.

It will be simple for one skilled in the art to determine the range of temperature and time conditions for each configuration which is molded. As an example, it is to be noted that a plate 20 mm. thickness attains the desired porosity at 800° C. in ten to fifteen minutes.

In molding these foamed structures, it may be necessary to treat the mold to prevent the adherence to the molded object to the mold. This treatment can be accomplished by coating the mold surfaces with a calcium oxide-containing layer.

With respect to the cooling step, it is only necessary to lower the temperature of the mass to below the softening temperature. In this way, when it is extracted from the mold, it will not be subject to deformation. Preferably, it is desired to cool the foamed structure to at 650° C. The time required to lower the mass to this temperature is variable but, naturally, for the sake of economics, it is preferable that it be accomplished as quickly as possible, the rate of cooling being about 100° C. to 600° C. per hour, within the temperature range of about 650° C. to 400° C.

For the utilization of these foamed structures in the building industry, it is generally sufficient to make the foamed body 20–30 mm. thick. However, it is also possible to produce structures which are 100 mm. thick, and even higher. It is preferable to add reinforcing rods or equivalent reinforcing media so that extra strength is provided especially for these larger structures. Moreover, it is possible to use reinforced foamed structures as beams in the building trade.

In addition to reinforced structures, it is preferred to make laminates of these foamed structures with other materials such as, glass, metal and plastics. With respect to the metal laminate, it is to be noted that the strain of the metal should be reduced by so-called "temperature cuts" in order to prevent the foamed structure from being loosened from the metal.

With respect to a glass foamed laminate, it is possible to melt a foamed structure onto one or both sides of the glass. This particular type of laminate is advantageous in view of the fact that the adherence between the foam and the glass is established by multiple point contact, and consequently, does not suffer from temperature changes is in the same manner as would a surface adhesion. Because of this fact, it is possible to prepare a glass-foamglass sandwich having two different glasses with different expansion curves.

It is also possible to coat these foamed structures with other sheets or films of either plastic or inorganic materials. These products can be particularly advantageous in the building industry where decorative effects are desired.

One of the major advantages of the foam of the present invention resides in its resistance to fire. For example, the foamed structure retains its original shape when it is slowly heated to high temperatures, for example, to 700° C. in thirty minutes. Moreover, even when jets of high temperature flames are played on the structures, there is no substantial damage, as invisible hairline cracks are formed which subsequently are eliminated by melting at higher temperatures, i.e. 800° C. and above. A test with a plate of foamed structure three centimeters thick showed that a fire, having temperatures of about 800° C. on one side will raise the temperature of the other side to only 100° C. after fifteen minutes, Consequently, it is apparent that the foamed structures of the present invention have both dimensional stability at high temperatures and a low rate of heat transfer by conduction.

One excellent use of the foamed structures of the present invention is in the building industry where the structures can be utilized as lost casings, i.e. the plate remains as a part of the wall, and thereby offers excellent protection against sound and heat. In this manner the weight of the intermediate walls can be reduced substantially in view of the fact that the density of the foamed structure plates is 0.15 to 0.3 g./cm.$^3$. Furthermore, the walls do not have to be finished as the foamed plates have a smooth surface.

Another use for these materials is in the roofing trade, wherein these materials can be used as roofing elements. The low density of these materials makes this very amenable both in earthquake areas or in places where building materials have to be transported over an extensive distance. Furthermore, the low heat conductivity of these materials makes them particularly advantageous in both arctic and tropical zones, as well as in temperate zones.

Still another use for these foamed structures is in the manufacture of concrete ceilings. By virtue of the excellent acoustical properties of the foamed silicate, when it is applied as a laminate onto concrete, there is a substantial reduction in the noise level due to walking and talking.

Still other applications can be found for this new product in the construction of ships, airplanes and vehicles, as well as in the construction of cooling and air-conditioning installations. Also, because of the low density of these materials, they can be used where it is necessary to have water-buoyant material.

To further illustrate this invention, the following specific examples as preferred specific embodiments of this invention are given. It is to be understood, however, that the invention is not to be limited by these examples, but instead, is to be defined by the specification and appended claims.

*Example 1*

To 150 g. rock wool and 1 litre of aqueous alkali silicate solution (dry substance 310 g.) are added 1 litre of 0.3% by weight cobalt sulfate solution. The rock wool is completely dissolved by heating and is then concentrated by evaporation in an iron vessel for six hours at 300° C. The solid residue, after cooling is removed from the vessel, and is crushed by conventional means to a grain size of 10 mm. maximum. This ground product filled into metal molds provided with non-sticky facings, is then heated for fifteen minutes to 800° C. and cooled slowly for about two hours.

Example 2

According to the method described in Example 1, 100 g. rock wool, 1 litre alkali silicate solution as in Example 1 and 20 g. calcium carbonate are heated for ten hours at 200° C. After crushing to grain sizes of 3 mm. maximum, the product is heated to 820° C. After eleven minutes the heating is stopped; and a four hour cooling period follows which brings the product down to room temperature. A porous body with a maximum pore size of 5 mm. is obtained.

Example 3

As described in Example 1, 150 g. rock wool and 20 g. pumice stone are mixed with 1 litre of water glass and 1 litre of water in which 20 g. CaO are dissolved. After evaporation at 200° C. the material is crushed to a grain size of 5 mm. Then the product is heated to 850° C. for fifteen minutes in metal molds which are coated with $Ca(OH)_2$. After 1½ hours of cooling, the foamed structure can be easily removed from the metal molds.

Example 4

As described in Example 1, 80 g. glass wool, 1 litre of the water glass solution specified in Example 1, and 1 litre aqueous iron chloride solution, 0.2% by weight, are evaporated for four hours at 250° C. After crushing the initial product to grain sizes below 5 mm. a heating step follows for ten minutes to 790° C. in molds into which a glass dish and a wire net were previously inserted. The formed body thus obtained is excellent for wainscoting and for lost casing in building constructions.

Example 5

A foamed enamel plate made according to Example 2 is connected by gluing one side with a pastel, non-inflammable polyvinylchloride foil of 0.2 mm. thickness. The resulting plate is highly attractive and therefore can be used wherever a decorating effect is desired.

It will be understood that the invention is susceptible to modification in order to adapt it to different usages and conditions and, accordingly, it is desired to comprehend such modifications within the invention as may fall within the scope of the appended claims.

What I claim is:

1. A method of producing molded shapes having excellent thermal, mechanical and acoustical properties comprising the steps of: forming a first mixture containing in parts by weight about one part alkali metal silicate, 0.02 to 0.7 part of inorganic fibrous silicate, and 2 to 10 parts of water; heating said mixture to about 140–360° C.; crushing said heated mixture to obtain particles of 0.1–10 mm.; heating said particles in a mold at 700–900° C. to obtain a foamed structure; and thereupon cooling the foamed structure to below the softening temperature thereby obtaining a rigid structure having excellent thermal, acoustical, mechanical and weathering properties.

2. The method of claim 1, wherein the inorganic fibrous silicate is selected from the group consisting of rock wool, glass wool, basalt wool, and asbestos wool.

3. The method of claim 1, wherein color-yielding inorganic metal salts are contained in the first mixture in quantities not more than 1% by weight, based on the first mixture.

4. The method of claim 1, wherein granulated alkaline earth carbonates are contained in the first mixture in quantities not more than 10% by weight, based on the first mixture.

5. The method of claim 1, wherein non-fibrous silicates having a particle size of 1–3 mm. are contained in the first mixture in quantities not more than 5% by weight, based on the first mixture.

6. The method of claim 1, wherein metallic reinforcing rods are incorporated in the first mixture.

7. A foamed product produced by the method of claim 1, and further characterized as being of a highly porous water-tight silicate with a density of 0.15 to 0.3 g./cm.$^3$.

8. A sandwich composite laminate comprising a first sheet consisting of glass, a second sheet consisting of the foamed structure as described by claim 7, and a third sheet consisting of glass, said first and third sheets of glass enclosing said second sheet of foamed structure in sandwich-like relationship, and adhering to said foamed structure in multiple point contact.

9. The sandwich composite laminate of claim 8, wherein the two sheets of glass have different expansion curves.

References Cited by the Examiner

UNITED STATES PATENTS

| | | | |
|---|---|---|---|
| 1,748,587 | 2/30 | Smedley | 161—161 |
| 1,966,069 | 7/34 | Kliefoth | 106—75 X |
| 2,038,034 | 4/36 | Fowler et al. | 106—75 X |
| 2,117,605 | 5/38 | Fowler et al. | 106—75 X |
| 2,189,293 | 2/40 | Ostromislensky | 161—149 |
| 2,978,340 | 4/61 | Veatch et al. | 106—75 |

EARL M. BERGERT, *Primary Examiner.*

CARL F. KRAFFT, *Examiner.*